US009683485B2

United States Patent
Dellmann et al.

(10) Patent No.: US 9,683,485 B2
(45) Date of Patent: Jun. 20, 2017

(54) EXHAUST-GAS TURBOCHARGER WITH ACOUSTICALLY ACTIVE IMPERFECTIONS

(71) Applicant: BorgWarner Inc., Auburn Hills, MI (US)

(72) Inventors: Udo Dellmann, Lohnsfeld (DE); Ivo Nawrath, Mainz (DE); Stefan Ebert, Kindenheim (DE)

(73) Assignee: BorgWarner Inc., Auburn Hills, MI (US)

( * ) Notice: Subject to any disclaimer, the term of this patent is extended or adjusted under 35 U.S.C. 154(b) by 161 days.

(21) Appl. No.: 14/722,698

(22) Filed: May 27, 2015

(65) Prior Publication Data
US 2015/0345380 A1 Dec. 3, 2015

(30) Foreign Application Priority Data
May 28, 2014 (DE) .................. 10 2014 210 217

(51) Int. Cl.
| | |
|---|---|
| *F02D 23/00* | (2006.01) |
| *F16K 1/16* | (2006.01) |
| *F16K 47/00* | (2006.01) |
| *F02B 39/16* | (2006.01) |
| *F02B 37/18* | (2006.01) |

(52) U.S. Cl.
CPC ............ *F02B 39/16* (2013.01); *F02B 37/183* (2013.01); *Y02T 10/144* (2013.01)

(58) Field of Classification Search
CPC ...... F02B 39/16; F02B 37/186; Y02T 10/144; F16K 5/06; F16K 25/04
USPC ............ 60/602; 415/159–164; 251/122, 298, 251/356, 314; 137/625.3; 285/21.3; 138/118, 45
See application file for complete search history.

(56) References Cited

U.S. PATENT DOCUMENTS

| | | | | |
|---|---|---|---|---|
| 1,919,232 A | * | 7/1933 | Lee .................... | F16K 25/04 251/122 |
| 2,114,858 A | * | 4/1938 | Rosch ................. | F16K 47/04 251/122 |
| 2,793,002 A | * | 5/1957 | Kellar .................. | F16K 3/184 251/204 |
| 3,469,591 A | * | 9/1969 | Odendahl ............ | F16K 47/06 137/625.3 |
| 6,571,831 B1 | * | 6/2003 | Hart .................... | G05D 7/012 138/45 |

(Continued)

FOREIGN PATENT DOCUMENTS

| | | | |
|---|---|---|---|
| CN | 202937444 U | * | 5/2013 |
| JP | 2006038080 A | * | 2/2006 |
| JP | 2013072422 A | * | 4/2013 |

*Primary Examiner* — Thai Ba Trieu
(74) *Attorney, Agent, or Firm* — Eric L. Doyle; Stephan A. Pendorf; Patent Central LLC

(57) ABSTRACT

An exhaust-gas turbocharger (1) having a turbine housing (2), which has a bypass duct (10) with a bypass opening (9); and having a control flap (3), which is mounted pivotably between a closed position and an open position in the turbine housing (2), the control flap (3), when in its closed position, resting on a bearing region (8) of a housing wall (11) which conducts exhaust gas and contains the bypass opening (9), wherein at least one flow imperfection (12A, 12B; 23A, 23B) is arranged in the turbine housing wall (11) in the bearing region (8) of the control flap (3) and/or in the control flap (3).

15 Claims, 4 Drawing Sheets

(56) References Cited

U.S. PATENT DOCUMENTS

| | | | | |
|---|---|---|---|---|
| 7,510,623 B2* | 3/2009 | Lutz | ................ | F16L 13/103 |
| | | | | 138/118 |
| 7,527,075 B2* | 5/2009 | Zoller | ................ | G05D 7/012 |
| | | | | 138/45 |
| 8,210,500 B2* | 7/2012 | Song | ................ | F16K 5/06 |
| | | | | 251/314 |
| 8,353,664 B2* | 1/2013 | Lombard | ................ | F01D 9/026 |
| | | | | 60/602 |
| 2009/0174180 A1* | 7/2009 | Lackey | ................ | F16L 13/103 |
| | | | | 285/21.3 |
| 2011/0203555 A1* | 8/2011 | Reinhart | ................ | F01L 3/04 |
| | | | | 123/536 |
| 2011/0268559 A1* | 11/2011 | Lombard | ................ | F01D 17/105 |
| | | | | 415/145 |
| 2012/0256115 A1* | 10/2012 | Maeda | ................ | F02B 37/16 |
| | | | | 251/356 |
| 2013/0168588 A1* | 7/2013 | Hill | ................ | F16K 39/028 |
| | | | | 251/298 |
| 2013/0186085 A1* | 7/2013 | Kuhlmeyer | ................ | F02B 37/183 |
| | | | | 60/602 |
| 2014/0102093 A1* | 4/2014 | Honma | ................ | F02B 37/183 |
| | | | | 60/602 |
| 2015/0377119 A1* | 12/2015 | Niedens | ................ | F02B 37/186 |
| | | | | 29/453 |

* cited by examiner

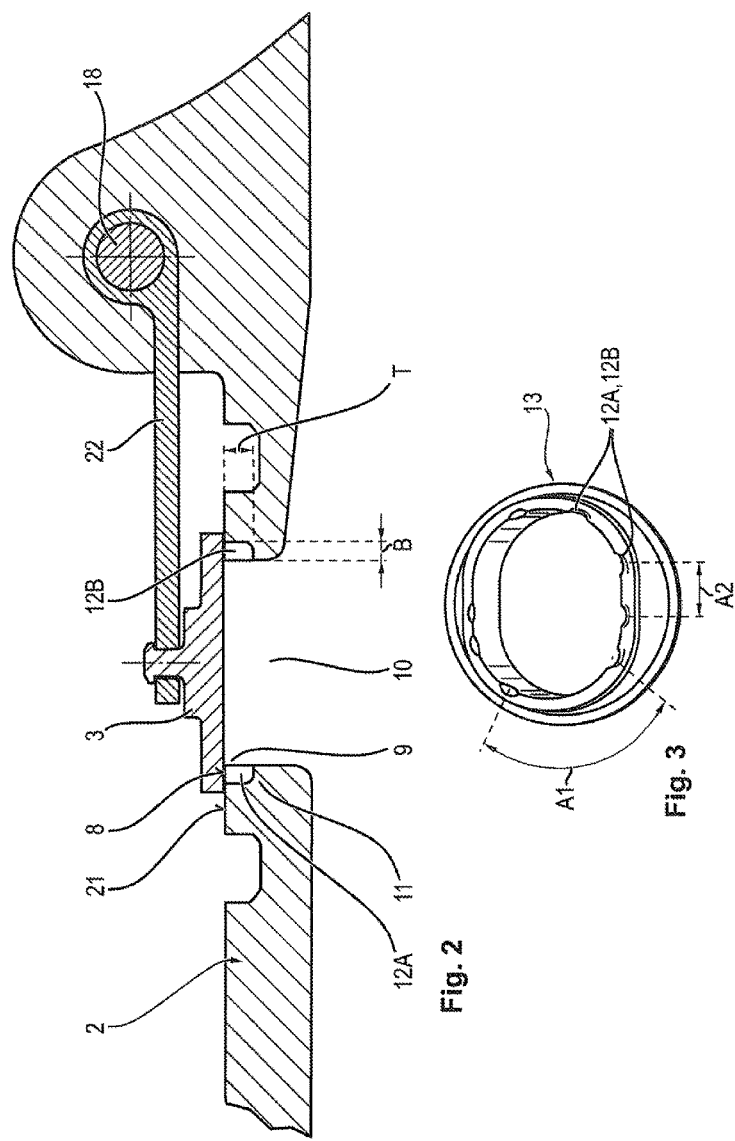

EXHAUST-GAS TURBOCHARGER WITH ACOUSTICALLY ACTIVE IMPERFECTIONS

CROSS-REFERENCE TO RELATED APPLICATIONS

This application claims the benefit of German Patent Application No. 102014210217.0 filed May 28, 2014, the disclosure of which is herein incorporated by reference in its entirety.

BACKGROUND OF THE INVENTION

Field of the Invention

The invention relates to an exhaust-gas turbocharger.

Description of the Related Art

Tests carried out within the context of the invention have shown that noises which are audible in the region of a control flap can arise during operation. In this regard, the tests have shown that primarily high-frequency noises in the region of 9 kHz can arise.

It is therefore an object of the present invention to provide an exhaust-gas turbocharger which is improved in terms of its noise characteristics.

BRIEF SUMMARY OF THE INVENTION

In detail, this object is achieved by an exhaust-gas turbocharger, which has a turbine housing provided with a bypass duct with a bypass opening. The exhaust-gas turbocharger furthermore has a control flap, which is mounted pivotably between a closed position and an open position in the turbine housing. In this case, the control flap, when in its closed position, rests on a bearing region of a housing wall which conducts exhaust gas and in which the bypass opening is arranged. According to the invention, it is provided that at least one flow imperfection is arranged in the housing wall in the bearing region of the control flap. As an alternative or in addition, the control flap itself can also be provided with such a flow imperfection.

By virtue of the fact that at least one flow imperfection is arranged in the housing wall, which conducts the exhaust gases, in the bearing region of the control flap and/or in the control flap itself, vibration excitation of the flow or of the housing edge is at least reduced.

If, in the case of a plurality of flow imperfections, the intervals therebetween vary, this gives rise to the advantage of diffuse excitation of the flow at different frequencies.

In a further particularly preferred embodiment, the flow imperfection can be in the form of a bevel or notch, this giving rise to the advantage of simple producibility and an on the whole attenuated excitation of the flow or of the housing portion.

Given different volumetric flow rates and different diameters of the bypass opening, a varying plurality of flow imperfections may be advantageous in order to make it possible to take these conditions into account.

This advantage likewise arises if the width and/or depth of the flow imperfections is varied depending on the application.

In addition to notches or bevels, it is also possible to provide protrusions or flow-guiding profiles as the flow imperfection, these protruding into the bypass opening. In principle, with this embodiment it is possible to achieve the same advantages as with the provision of notches or bevels.

Furthermore, it is possible according to the invention to provide one or a plurality of bevels or notches which, as already explained above, can each be arranged around the circumference of the bypass opening at varying intervals apart. As an alternative thereto, it is possible to provide a bevel or notch which runs completely around the bypass opening.

The invention further concerns an insert ring for a bypass opening of an exhaust-gas turbocharger which can be marketed independently, it also being possible for this insert ring to be in the form of a retrofit part which can be inserted into already existing bypass openings of an exhaust-gas turbocharger. In the case of a single-stage system, the bypass opening can be the opening which connects the turbine inlet to the turbine outlet for bypassing the turbine wheel. In the case of multi-stage systems, the bypass opening can serve for bypassing a complete turbocharger.

BRIEF DESCRIPTION OF THE SEVERAL VIEWS OF THE DRAWINGS

Further details, features and advantages of the invention will become apparent from the following description of exemplary embodiments on the basis of the drawing, in which:

FIG. 2 shows a schematically simplified enlarged sectional illustration of part of the turbine housing of the exhaust-gas turbocharger with a control flap and a bypass opening, FIG. 3 shows a perspective illustration of an insert ring.

DETAILED DESCRIPTION OF THE INVENTION

Figure 1:
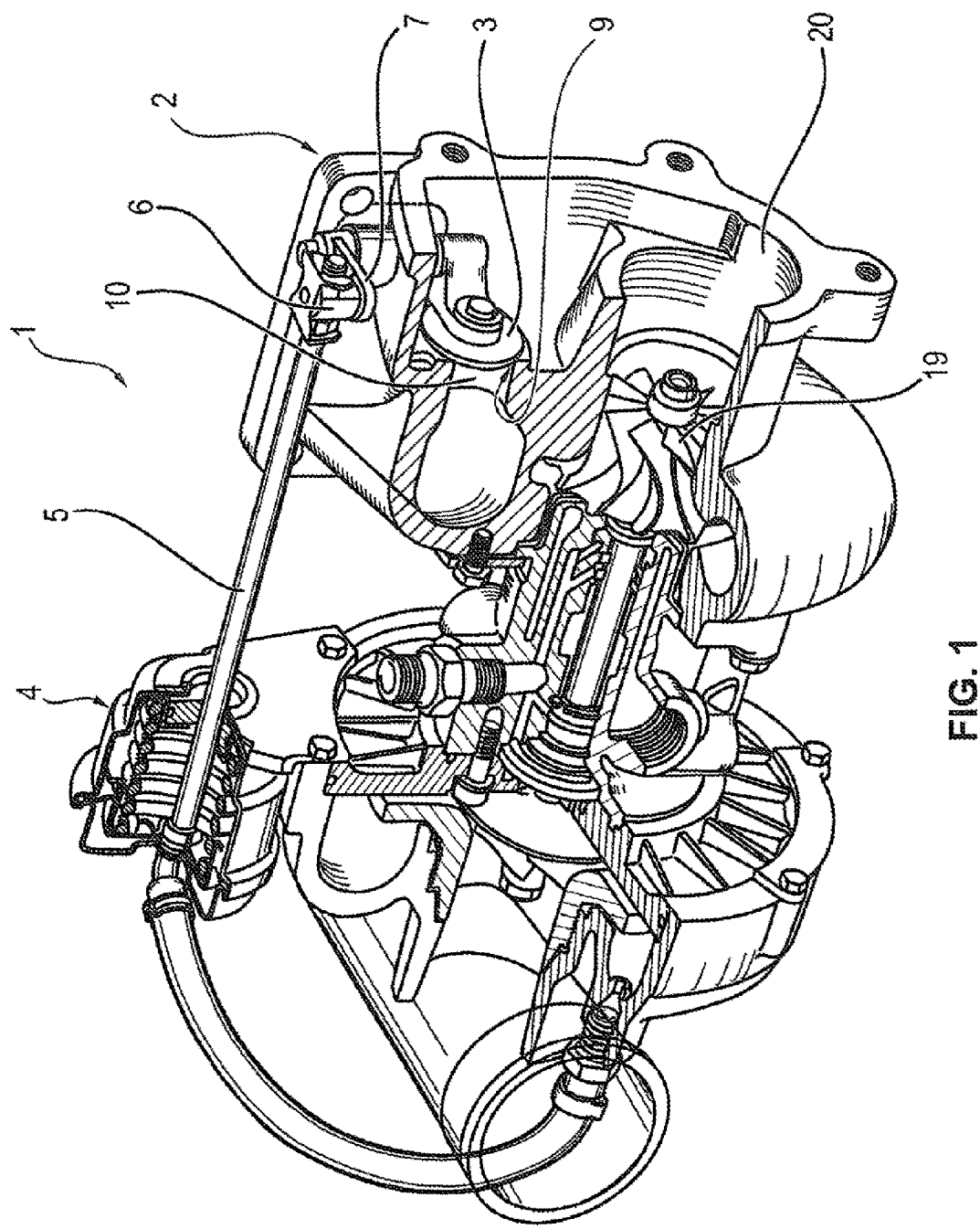
FIG. 1 shows a schematic sectional illustration of a first embodiment of an exhaust-gas turbocharger according to the invention.

FIG. 1 shows an exhaust-gas turbocharger 1 according to the invention, which comprises a turbine housing 2 provided with a wastegate arrangement. This wastegate arrangement has a bypass duct 10, which connects the turbine inlet and the turbine outlet and for this purpose is provided with a bypass opening 9. Furthermore, the wastegate arrangement has a control flap 3, which is mounted pivotably between a closed position, which is shown in FIG. 1, and an open position in the turbine housing. To actuate the control flap (wastegate flap) 3, provision is made of an actuating device 4, in this example a control capsule, which is connected to the control flap 3 via a control rod 5, a connecting piece 6 and an outer lever 7, such that this actuating apparatus 4 can be used to pivot the control flap 3 into the aforementioned closed position and the open position, in which the control flap 3 releases the bypass opening 9 of the bypass duct 10, such that exhaust gas fed in can be guided past the turbine wheel 19 to the turbine housing outlet 20.

The exhaust-gas turbocharger 1 according to the invention of course also has all of the other components of such turbochargers, such as in particular the compressor with a compressor wheel and a compressor housing, but these do not have to be described in detail for explaining the principles of the present invention.

FIG. 2 shows a partial section through the turbine housing 2, in which the bypass duct 10 with the bypass opening 9 thereof is visible. The control flap 3, which is connected via an inner lever 22 to the control shaft 18 connected to the outer lever 7, is in the closed position, in which the bypass duct 10 or the bypass opening 9 is closed.

In this closed position, a bearing region 8 of a turbine wall 11 of the turbine housing 2 is formed, the control flap 3 resting on said bearing region with its outer circumferential rim on the end face 21 of said turbine wall 11, as can be seen in detail in FIG. 2.

At least one flow imperfection 12A, 12B, which can have a width B and a depth T which in principle are freely selectable, is arranged in said bearing region 8.

Although, in FIG. 2, this flow imperfection 12A, 12B is arranged only in the bearing region 8, it is likewise possible according to the invention to provide such a flow imperfection or a plurality of such flow imperfections in the control flap 3, these then being arranged in the region of the control flap which rests on the bearing region 8.

According to the invention, it is possible that the flow imperfection runs partially around the bypass opening 9 or is formed so as to run completely around this opening 9.

Furthermore, it is possible, as already stated above, to provide a plurality of such flow imperfections 12A, 12B.

The width B and the depth T in the case of a plurality of flow imperfections 12A, 12B can be adapted or chosen depending on the application and it is possible that the individual flow imperfections each have different widths and depths, but it is likewise possible in principle that all of the flow imperfections have an identical form both in respect of their geometrical configuration and their dimensioning.

Furthermore, it is possible according to the invention to vary the positions of the flow imperfections from application to application, in order to be able to achieve noise reduction.

This also applies to the choice of the number of flow imperfections, which can likewise vary from case to case.

In a particularly preferred embodiment, the bypass opening 9 is provided with an insert ring 13, which is shown in FIG. 3. When inserted in the bypass opening 9, this insert ring 13 forms the wall region which corresponds to the turbine housing wall 11 of the embodiment as shown in FIG. 2, which comprises the bearing region 8. Accordingly, this region of the insert ring which corresponds to the bearing region 8 is provided with at least one flow imperfection 12A, 12B. When an insert ring 13 is provided, it is also possible, however, to provide a plurality of flow imperfections 12A, 12B in different widths and depths and positions, as can be seen from FIG. 3.

Figure 4:
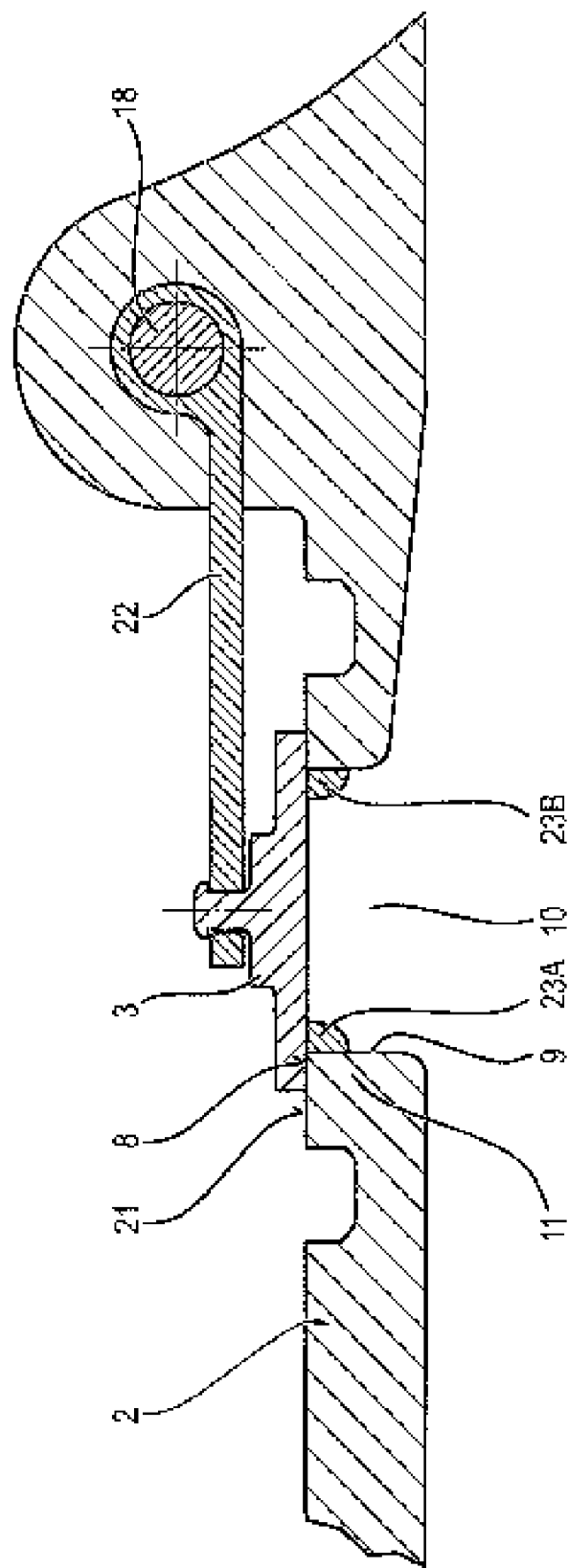
FIG. 4 shows an illustration, corresponding to FIG. 2, of an enlarged sectional illustration of a further embodiment of the exhaust-gas turbocharger according to the invention.

FIG. 4 shows an illustration, corresponding to FIG. 2, of a further embodiment of the exhaust-gas turbocharger according to the invention. In contrast to the embodiment shown in FIG. 2, in this embodiment two protrusions or flow-guiding profiles 23A and 23B are provided as flow imperfections. It is possible in this embodiment, too, as described above on the basis of the bevels or notches, to vary the number, position and dimensioning of these flow-guiding profiles and the interval therebetween. Accordingly, the two flow-guiding profiles 23A and 23B visible in FIG. 4 are only representatives of either one or a plurality of such flow imperfections in the form of protrusions.

Otherwise, reference can be made to the description of FIG. 2 in respect of the further components visible in FIG. 4.

Figure 6:
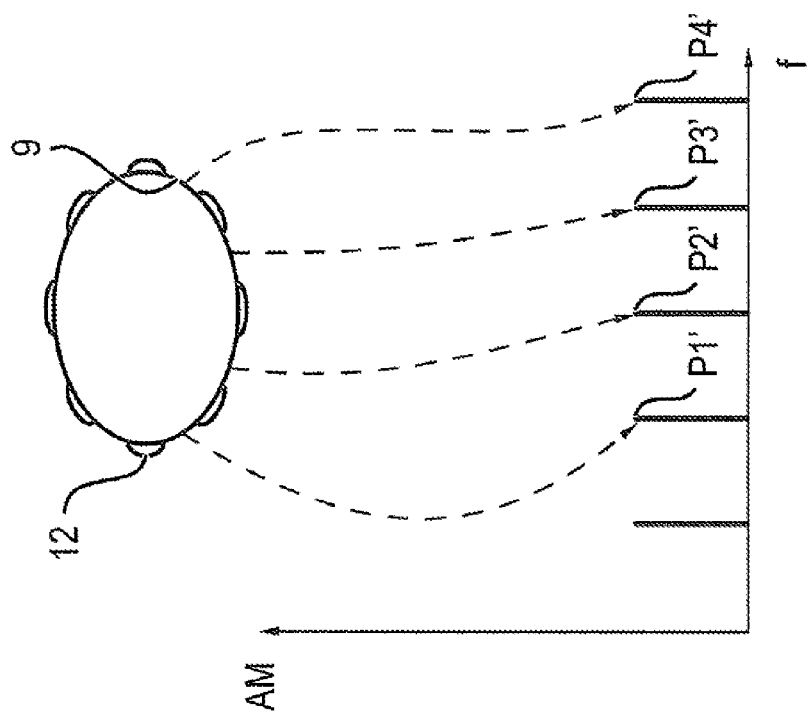
FIGS. 5 and 6 show schematically simplified illustrations of the amplitudes of the flow, plotted against the flow frequency in the case of a turbocharger according to the prior art and, respectively, a turbocharger according to the principles of the present invention.
Figure 5:
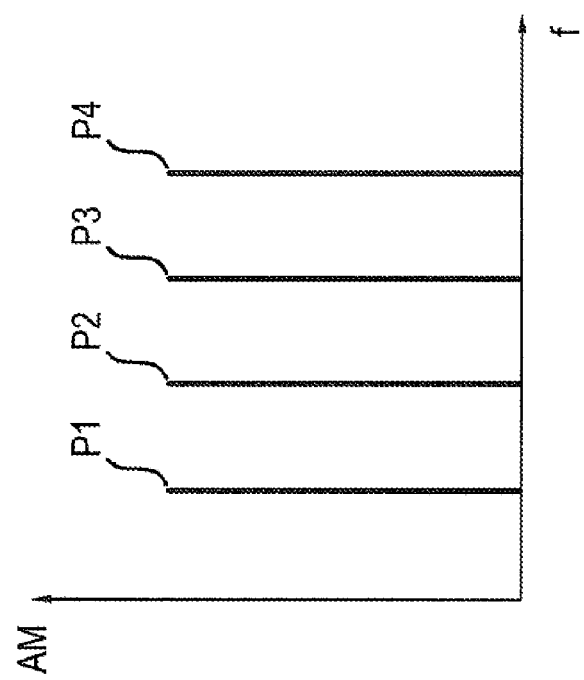

FIGS. 5 and 6 schematically show slightly simplified illustrations of amplitudes of the flow through the bypass opening. FIG. 5 in this respect shows the peaks P1 to P4 of a known arrangement, which, as a comparison with FIG. 6 shows, are considerably higher than the peaks P1' to P4' of the arrangement according to the invention, which are assigned by way of example to flow imperfections 12 of the bypass opening 9.

Since at least one flow imperfection is provided in the control flap itself and/or in a bearing region of the control flap around the bypass opening, the body-borne noise in the 8.7 kHz range can be reduced to a measure which was no longer measurable; this was shown by further tests carried out within the context of the invention. In the 0.57 kHz range, these tests furthermore showed that it was possible to reduce the body-borne noise considerably.

In summary, it can therefore be established that the introduction of flow imperfections of an indeterminate width, depth, number and position over the ring circumference (bearing region of the control flap) makes it possible to considerably improve the production/excitation of the flow noise and thereby the acoustic characteristics of the exhaust-gas turbocharger according to the invention.

In addition to the above written disclosure of the invention, reference is hereby explicitly made to the diagrammatic illustration thereof in FIGS. 1 to 6.

LIST OF REFERENCE SIGNS

1 Exhaust-gas turbocharger
2 Turbine housing
3 Control flap
4 Actuating device
5 Control rod
6 Connecting piece
7 Outer lever
8 Bearing region
9 Bypass opening
10 Bypass duct
11 Turbine housing wall
12, 12A, 12B Flow imperfection (bevels, notches)
13 Insert ring
14, 15 Outlet regions
16, 17 Base corners
18 Control shaft
19 Turbine wheel
20 Turbine outlet
21 End face
22 Inner lever
A1, A2 Varying intervals
23A, 23B Flow imperfections in the form of protrusions
B Width
T Depth
P1-P4 Peaks of the prior art
P1'-P4' Peaks according to the principles of the present invention

The invention claimed is:

1. An insert ring (13) adapted to be seated in a bypass opening (9) of an exhaust-gas turbocharger (1), the insert ring (13) having at least one flow imperfection (12; 12A, 12B; 23A, 23B) in a form of a bevel, a notch, a protrusion, or a flow guiding profile, being arranged completely around or partially around a circumference of the bypass opening (9) to reduce vibration excitation of flow.

2. The insert ring according to claim 1, wherein the at least one flow imperfection is a plurality of flow imperfections (12; 12A, 12B; 23A, 23B).

3. The insert ring according to claim 2, wherein the plurality of the flow imperfections (12; 12A, 12B; 23A, 23B) is arranged around the circumference of the bypass opening (9) at varying intervals (A1, A2) apart.

4. The insert ring according to claim 2, wherein the plurality of the flow imperfections (12; 12A, 12B; 23A, 23B) is arranged completely around the bypass opening (9).

5. The insert ring according to claim 2, wherein the plurality of the flow imperfections (12; 12A, 12B; 23A, 23B) is arranged partially around the bypass opening (9).

6. The insert ring according to claim 2, wherein the plurality of the flow imperfections (12; 12A, 12B; 23A, 23B) in a bearing region (8) is provided with different separations from each other.

7. The insert ring according to claim 1, wherein the at least one flow imperfection (12; 12A, 12B; 23A, 23B) has a width (B) or a depth (T) which varies.

8. An exhaust-gas turbocharger (1) having
a turbine housing (2), which has a bypass duct (10) with a bypass opening (9); and
a control flap (3), which is mounted pivotably between a closed position and an open position in the turbine housing (2), the control flap (3), when in its closed position, resting on a bearing region (8) of a housing wall (11) which conducts exhaust gas and contains the bypass opening (9), and when in the open position is pivoted away from the bypass opening (9),
wherein at least one flow imperfection (12; 12A, 12B; 23A, 23B) in a form of a bevel, a notch, a protrusion, or a flow guiding profile is arranged in at least one of the housing wall (11) in the bearing region (8) of the control flap (3), and
the control flap (3).

9. The exhaust-gas turbocharger according to claim 8, wherein the at least one flow imperfection is a plurality of flow imperfections (12; 12A, 12B, 23A, 23B).

10. The exhaust-gas turbocharger according to claim 9, wherein the plurality of flow imperfections (12; 12A, 12B; 23A, 23B), these are arranged distributed around the circumference of the bypass opening (9) at varying intervals (A1, A2) apart.

11. The exhaust-gas turbocharger according to claim 9, wherein the plurality of the flow imperfections (12; 12A, 12B, 23A, 23B) is in the form of a bevel or a notch and is completely arranged around the bypass opening (9).

12. The exhaust-gas turbocharger according to claim 9, wherein the plurality of the flow imperfections (12; 12A, 12B, 23A, 23B) is in the form of a bevel or a notch having a width (B) and a depth (T) and wherein the plurality of the flow imperfections (12, 12A, 12B; 23A, 23B) is arranged partially around the bypass opening (9).

13. The exhaust-gas turbocharger according to claim 9, wherein the plurality of the flow imperfections (12; 12A, 12B; 23A, 23B) in the bearing region (8) is provided with different separations from each other.

14. The exhaust-gas turbocharger according to claim 8, wherein the at least one flow imperfection (12; 12A, 12B; 23A, 23B) has a width (B) or a depth (T) which varies.

15. The exhaust-gas turbocharger according to claim 8, wherein the at least one flow imperfection (12; 12A, 12B; 23A, 23B) is formed in an insert ring (13) inserted in the bypass opening (9).

* * * * *